United States Patent Office 2,974,030
Patented Mar. 7, 1961

2,974,030

INSECTICIDAL PLANT MULCH

Robert J. Geary, Blue Point, N.Y., assignor to Plant Products Corporation, Long Island City, N.Y.

No Drawing. Filed Mar. 11, 1957, Ser. No. 644,966

17 Claims. (Cl. 71—3)

This invention relates to an insecticidal plant mulch, and more particularly to a relatively stable multi-purpose insecticidal plant mulch.

A plant mulch material may be defined as any covering placed upon the soil around a plant to conserve moisture, maintain the soil temperature uniform, discourage weeds, prevent packing of the soil and soil erosion, maintain the soil in loose and aerated condition, and, in the case of organic mulch materials, contribute towards improving and fertilizing the soil by decomposition and the like. Most good mulching materials are usually in particulate form, and preferably organic in nature whereby their decomposition contributes to the quality of the soil. As representative of organic mulching materials, there may be mentioned grass clippings, straw from oats, wheat, rye, rice and beans, chock slough, hay, salt marsh hay, alfalfa hay, strawy manure, leaves, shredded cane, shredded corn stalks, pine needles, peanut shells, rice hulls, buck wheat hulls, shredded redwood bark, sea weeds, tobacco stems, ground corn cobs, peat moss, sphagnum moss, cotton seed hulls, cotton burrs, clover chaff, alfalfa chaff, spent hops, pea vines, shredded cardboard and paper, wood shavings, sawdust, charcoal and the like. As representative of inorganic mulch materials, there may be mentioned ground calcium carbonates, soap stone, slaked limes, Pyrax, Attapulgus and other types of clays, kaolin, aerogels such as Hi-Sil (silica), expanded forms of silica such as perlite, Krum and the like, expanded mica (vermiculite), pyrophyllite, volcanic dust, diatomaceous earth, talc and the like.

Plant mulch materials constitute an ideal medium in which to include insecticides which would prevent access to the plant of insects in and on the surface of the soil adjacent to the plant. However, much difficulty has been encountered in formulating a commercially acceptable insecticidal plant mulch material since decomposition and inactivation of the insecticide often takes place, which may be caused either by exposure to the elements in the atmosphere or soil or by contact and/or reaction between the insecticide and other components of the mulch material.

It is an object of this invention to provide an insecticidal plant mulch material which will not be subject to the above disadvantages. Another object of this invention is the provision of a multi-purpose insecticidal plant mulch material. Still another object of this invention is the provision of a relatively stable and long lasting multi-purpose insecticidal plant mulch material. Other objects and advantages of the instant invention will appear as the description proceeds.

The attainment of the above objects is made possible by the instant invention which comprises an insecticidal plant mulch composition in particulate form comprising approximately by weight, 0.1 to 5% of a nuclearly polychlorinated organic contact insecticide, 0.05 to 5% of a systemically active insecticide, 80 to 99% of a member of the group consisting of inactive and catalytically active mulch materials, and, when a catalytically active mulch material is present, 1 to 18% of a decatalyzer or deactivator. The insecticidal plant mulch compositions of the instant invention have been found to be highly effective and relatively long lasting in their contact and systemic insecticidal activity. They further enable simultaneous mulching, enrichment of the soil feeding and substantially complete protection of the plant against insects attacking same above, at and below soil level.

As examples of the nuclearly polychlorinated organic contact insecticides operative in the compositions of the instant invention, the following insecticides listed in Table A are given for illustrative purposes only:

TABLE A

Aldrin—at least 95% of 1,2,3,4,10,10-hexachloro-1,4,4a, 5,8,8a - hexahydro - 1,4 - endo - exo - 5,8 - dimethanonaphthalene Chlordane—1,2,4,5,6,7,8,8-octachloro - 2,3,3a,4,7,7a-hexahydro-4,7-methanoindene DDT—1,1,1-trichloro-2,2,-bis (p-chlorophenyl) ethane Dieldrin—at least 85% 1,2,3,4,10,10 - hexachloro- 6-7-epoxy - 1,4-4a,5,6,7,8,8a - octahydro - 1,4 - endo - exo-5,8-dimethanonaphthalene Endrin—1,2,3,4,10,10 - hexachloro - 6,7 - epoxy - 1,4,4a, 5,6,7,8,8a - octahydro - 1,4 - endo - endo - 5,8 - dimethanonaphthalene Heptachlor—1 (or 3a),4,5,6,7,8,8-heptachloro-3a,4,7,7a-tetrahydro-4,7-methanoindene Isodrin—1,2,3,4,10,10 - hexachloro - 1,4,4a,5,8,8a - hexahydro-1,4-endo-endo-5,8-dimethanonaphthalene Lindane—gamma isomer of benzene hexachloride TDE(DDD)—1,1 - dichloro - 2,2-bis (p - chlorophenyl)-ethane It will be noted that all of the insecticides in Table A above are mononuclear or dinuclear carbocyclic compounds containing at least 4 chlorine atoms, at least 2 of which are nuclearly substituted. They are generally long lasting insecticides of the residual type, their activity being primarily by contact, although in some cases a stomach action is also exerted. While these insecticides are well known contact insecticides having a highly desirable activity towards insects and the like, they are readily decomposed, isomerized, and/or inactivated when in contact with the soil and the usual mulch materials and other insecticides.

As examples of systemically active insecticides operative in the compositions of the instant invention, the following insecticides listed in Table B below are given for illustrative purposes only:

TABLE B

| Chemical | Available As |
| --- | --- |
| Octamethyl pyrophosphoramide | OMPA, Schradan, Pestox III. |
| O,O-diethyl bis (dimethylamido) pyrophosphate, unsymmetrical | |
| O,O-diethyl bis (dimethylamido) pyrophosphate, symmetrical | |
| Diethoxythiophosphoryl tetramethyldiamidophosphate | |
| Decamethylpentamidotriphosphate | |
| O,O,O-triethyl dimethylamido pyrophosphate | |
| O-ethyl tri (dimethylamido) pyrophosphate | |
| Tetra (monoisopropylamido) pyrophosphate | |
| Alpha-diethoxyphosphinodithioacetylurea | |
| Alpha-dimethoxyphosphinodithioacetylurea | |
| Diethoxyphosphinodithioacetamide | |
| Dimethoxyphosphinodithioacetamide | |
| Dipropoxyphosphinodithioacetamide | |
| N,N-diethyl dipropoxyphosphinodithioacetamide | |
| Bis (dimethylamido) phosphoryl fluoride | Shrader's No. 13/25. |
| Bis (isopropylamido) phosphoryl fluoride | Isopestox. |
| Dimethylamido (isopropylamido) phosphoryl fluoride | |
| Bis (dimethylamido) phosphoryl azide | |
| Bis (monoisopropylamido) phosphoryl azide | |
| 2-chlorovinyl diethyl phosphate | |
| 1-carbomethoxy 1-propen-2-yl dimethyl phosphate | |
| Alpha-diethoxyphosphinoacetoacetic acid, ethyl ester | |
| O,O-diethyl O-ethylmercaptoethyl) thiophosphate, commonly in admixture with its isomer, namely O,O-diethyl S-(ethylmercaptoethyl) thiophosphate | Systox, Demeton. |
| O,O-dimethyl analogue of Systox | Meta-Systox. |
| O,O-diisopropyl analogue of Systox | |
| O,O-diethyl S-2-ethylmercaptomethyl dithiophosphate | |
| O,O-diethyl S-2-isopropylmercaptomethyl dithiophosphate | |
| O,O-dimethyl S-(2-oxoureidoethyl) dithiophosphate | |
| O,O-dimethyl S-carbamylmethyl dithiophosphate | |
| O,O-diethyl S-(diethylaminoethyl) thiophosphate | |
| O,O-diethyl O-(methylmercaptoethyl) thiophosphate | |
| O,O-diethyl O-(butylmercaptoethyl) thiophosphate | |
| O,O-diethyl O-(hexylmercaptoethyl) thiophosphate | |
| O,O-diethyl O-(ethylmercaptopropyl) thiophosphate | |
| O,O-diethyl O-(ethylmercaptobutyl) thiophosphate | |
| O,O-diethyl O-(ethylmercaptoisopropyl) thiophosphate | |
| 1-isopropyl-3-methyl pyrazolyl-5-dimethylcarbamate | Isolan. |
| 3-methyl-pyrazolyldimethylcarbamate | Geigy 22870. |
| Sodium selenate | |
| Potassium selenate | |
| Sodium fluoroacetate | |
| O,O-diethyl-Se-ethylmercaptoethyl seleno thiophosphate | |
| O,O-diethyl-Se-methylmercaptoethyl seleno thiophosphate | |
| O,O-diethyl-Se-methylmercaptoethyl seleno phosphate | |
| O,O-diethyl-Se-ethylmercaptoethyl seleno phosphate | |
| O,O-dimethyl-O-(ethylmercaptoethyl) phosphate (P=O analogue of Meta-Systox) | Meta-Isosystox. |

These and similar systemically active plant insecticides, including their oxidation or metabolic products, as where the S of a mercapto group is converted to a sulfoxide or a sulfone prior to or after entrance into the roots of the plant as by lipoid solubility, are translocated to, and remain for periods up to several months in, all parts of the plant in amounts lethal to insects feeding thereon. They should be substantially non-phytotoxic when used in the amounts required for killing insects, and relatively stable over extended periods. Those preferred are the organic phosphates, more particularly those of the foregoing type which are acid anhydrides of substituted phosphoric acids having the general formula.

wherein $R^1$ and $R^2$ are lower alkyl, alkoxy or alkylamino stably linked to the P atom, X is oxygen or sulfur, and Y is an acid group, the P—Y link having the character of an acid anhydride. Those compounds having as part of the anhydride linkage saturated, unsubstituted aliphatic or aromatic hydrocarbon groups, or such groups containing $NH_2$, $SO_3$, COOH, Cl, OH, CO and $OCH_3$ have been found to exhibit substantially no systemic activity.

The inactive plant mulch materials operative in the instant invention are in general those of the above mentioned mulch materials which are either alkaline in nature or which do not liberate acid materials on decomposition. As examples of such inactive plant mulch materials there may be mentioned calcium carbonate or limestone, Hi-Sil, soapstone, slaked lime, and the like.

Among the catalytically active plant mulch materials operative in the instant invention, there may be mentioned those of the above identified plant mulch materials which are acidic in nature, exhibit surface acidity or tend to liberate acid material upon decomposition. These include most of the inorganic materials and certain of the organic materials in an intermediate stage of decomposition such as peat moss and the like. Such catalytically active plant mulch materials have in general a detrimental effect upon the nuclearly polychlorinated organic contact insecticide employed in the instant invention, which may be due to removal of one or more chlorine or hydrogen chloride groups from the insecticide, by isomerization of the position in which the chlorine atom is substituted, or the like. It will accordingly be understood that the term "catalytically active" employed herein refers to the above described catalytic activity or function of such plant mulch materials in promoting detrimental chemical and other changes in the said nuclearly polychlorinated organic contact insecticides. When such catalytically active plant mulch materials are present, a decatalyzer or deactivator is necessary to reduce or nullify the detrimental catalytic activity of such plant mulch materials on said contact insecticides. As a matter of fact, it is preferred to include a decatalyzer regardless of the type of mulch material employed, in view of the relatively low cost of the small amounts necessary, and the possible or probable presence of catalytically active substances in the soil tending to deactivate said contact insecticide.

The preferred decatalyzer or deactivator for use in the compositions of the instant invention is urea, although other similar nitrogen containing compounds may be employed such as hexamethylenetetramine and the like. Such compounds serve at the same time to provide a beneficial source of nitrogen for the plant. Other decatalyzers useful herein are oxygen containing compounds of relatively low volatility, preferably diethylene glycol. Other such compounds include alcohol compounds such as ethylene glycol, triethylene glycol, glycerine, and epichlorhydrin, in addition to diacetone alcohol, Tween 20 (Atlas Powder Co.), Triton X–100 (Rohm and Haas Co.), Emcol H 85 A (Emulsol Corp.), Thiosolve (Geary Chemical Corp), and the like.

The compositions of the instant invention are prepared in any desired manner by mixing the various components in any order, till a uniform and homogeneous mixture is obtained. The multi-purpose insecticidal plant mulch material thus obtained is then employed in the usual manner by spreading it on the soil around the plant to be mulched and/or protected.

The following examples, in which parts are by weight unless indicated, are given for illustrative purposes only and are not to be regarded as limitative:

The following components are mixed until a uniform homogeneous particulate composition is obtained.

Example 1
0.125% dieldrin
0.250% Meta-Systox
5.000% urea
94.625% granular or powdered peat moss

Example 2
2.0% DDT
0.25% O,O-diethyl S-Z-ethylmercaptoethyl dithio phosphate
5.0% urea
92.75% granular or powdered peat moss

Example 3
1.0% DDT
0.5% OMPA
5.0% urea
93.5% expanded mica

Example 4
0.25% Chlordane
0.25% 2-chlorovinyl diethyl phosphate
5.0% urea
3.0% glycerine
91.5% perlite

Example 5
0.2% aldrin
0.3% Meta-Isosystox
6.0% diethylene glycol
93.5% granular or powdered peat moss

Example 6
0.5% DDT
0.25% Systox
5.0% urea
94.25% granular or powdered peat moss The above plant mulch materials are spread on the soil around the plant in the usual manner, and are found to be surprisingly stable, long lasting, and effective both as a mulch and as a contact and systemic insecticidal material.

This invention has been disclosed with respect to certain preferred embodiments, and various modifications and variations thereof will become obvious to the person skilled in the art. It is to be understood that such modifications and variations are to be included within the spirit and scope of the instant invention.

What I claim is:

1. An insecticidal plant mulch composition in particulate form consisting essentially of, approximately by weight, 0.1 to 5% of a nuclearly polychlorinated organic contact insecticide, 0.05 to 5% of a systemically active insecticide, 80 to 99% of mulch materials, and 1 to 18% of a decatalyzer selected from the group consisting of urea and hexamethylenetetramine.

2. A composition as defined in claim 1 wherein the nuclearly polychlorinated organic contact insecticide is dieldrin.

3. A composition as defined in claim 1 wherein the nuclearly polychlorinated organic contact insecticide is DDT.

4. A composition as defined in claim 1 wherein the nuclearly polychlorinated organic contact insecticide is Chlordane.

5. A composition as defined in claim 1 wherein the nuclearly polychlorinated organic contact insecticide is aldrin.

6. A composition as defined in claim 1 in which the systemically active insecticide is Meta-Systox.

7. A composition as defined in claim 1 in which the systemically active insecticide is Meta-Isosystox.

8. A composition as defined in claim 1 in which the systemically active insecticide is OMPA.

9. A composition as defined in claim 1 in which the systemically active insecticide is 2-chlorovinyl diethyl phosphate.

10. A composition as defined in claim 1 in which the said mulch material is peat moss.

11. A composition as defined in claim 1 in which the said mulch material is expanded mica.

12. A composition as defined in claim 1 in which the said mulch material is perlite.

13. A composition as defined in claim 1 in which the decatalyzer is urea.

14. An insecticidal plant mulch composition in particulate form consisting essentially of, approximately by weight, 0.1 to 5% of dieldrin, 0.05 to 5% of Meta-Systox, 80 to 99% of peat moss, and 1 to 18% of urea.

15. An insecticidal plant mulch composition in particulate form consisting essentially of, approximately by weight, 0.1 to 5% of DDT, 0.05 to 5% of O,O-diethyl S-2-ethylmercaptoethyl dithiophosphate, 80 to 99% of peat moss and 1 to 18% of urea.

16. An insecticidal plant mulch composition in particulate form consisting essentially of, approximately by weight, 0.1 to 5% of DDT, 0.05 to 5% of OMPA, 80 to 99% of expanded mica, and 1 to 18% of urea.

17. An insecticidal plant mulch composition in particulate form consisting essentially of, approximately by weight, 0.1 to 5% of DDT, 0.05 to 5% of Systox, 80 to 90% of peat moss, and 1 to 18% of urea.

References Cited in the file of this patent
UNITED STATES PATENTS

| | | |
|---|---|---|
| Re. 24,184 | Sanders et al. | July 24, 1956 |
| 2,639,259 | Wellman et al. | May 19, 1953 |
| 2,751,713 | Abramitis | June 26, 1956 |
| 2,754,244 | Gysin et al. | July 10, 1956 |
| 2,760,900 | Glenn et al. | Aug. 28, 1956 |
| 2,875,120 | Trademan et al. | Feb. 24, 1959 |